(12) United States Patent
Isgar

(10) Patent No.: US 11,227,504 B1
(45) Date of Patent: Jan. 18, 2022

(54) GROUP STUDY SYSTEM

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 551 days.

(21) Appl. No.: 16/138,491

(22) Filed: Sep. 21, 2018

Related U.S. Application Data

(60) Provisional application No. 62/609,473, filed on Dec. 22, 2017.

(51) Int. Cl.
*G09B 5/12* (2006.01)
*H04L 12/18* (2006.01)
*G09B 5/14* (2006.01)

(52) U.S. Cl.
CPC .............. *G09B 5/12* (2013.01); *G09B 5/14* (2013.01); *H04L 12/1818* (2013.01); *H04L 12/1822* (2013.01)

(58) Field of Classification Search
CPC .... G06Q 50/01; G06Q 10/10; G06Q 10/1095; G06Q 50/205
See application file for complete search history.

(56) References Cited

U.S. PATENT DOCUMENTS

| | | | | |
|---|---|---|---|---|
| 2005/0227216 A1* | 10/2005 | Gupta | ................ | G09B 7/00 434/322 |
| 2009/0083183 A1* | 3/2009 | Rao | ................ | G06Q 50/01 705/50 |
| 2012/0136572 A1* | 5/2012 | Norton | ................ | G01C 21/3407 701/465 |
| 2013/0159270 A1* | 6/2013 | Urmy | ................ | G06Q 10/109 707/706 |
| 2013/0263020 A1* | 10/2013 | Heiferman | ................ | H04L 12/1818 715/753 |
| 2015/0170535 A1* | 6/2015 | Negash | ................ | G09B 5/10 434/350 |
| 2016/0162845 A1* | 6/2016 | Carroll | ................ | G06F 3/0482 705/7.19 |
| 2016/0314705 A1* | 10/2016 | Segal | ................ | G06F 3/0482 |
| 2017/0024091 A1* | 1/2017 | Hosier, Jr. | ................ | H04L 67/306 |
| 2017/0046966 A1* | 2/2017 | Velasquez | ................ | G09B 7/02 |
| 2017/0083210 A1* | 3/2017 | Parker | ................ | H04L 12/1822 |
| 2018/0077092 A1* | 3/2018 | Jalil | ................ | H04L 51/046 |
| 2019/0012754 A1* | 1/2019 | Eleweke | ................ | H04L 51/046 |
| 2019/0279522 A1* | 9/2019 | Jafari | ................ | G09B 7/00 |

* cited by examiner

*Primary Examiner* — Justin S Lee
(74) *Attorney, Agent, or Firm* — Schmeiser, Olsen & Watts LLP

(57) ABSTRACT

A group study system is described. The group study system allows for students to form study groups with other students in the same class or related classes by utilizing various technologies that make such a system possible. The system provides for an anonymous creation of the study sessions and maintains the anonymity until all students joining the study session participate in the study session. These sessions can be in person and virtual. Hybrid and virtual sessions are becoming more and more important with the increasing presence of online education. This system harnesses technology in an innovative way to do something that was not possible years ago by enabling students to gather in a learning environment with other students who previously did not know each other. Additionally, the system operates to allow crowd sourcing of data for the input of exam data, including date and time of the exam in order to automatically extend exam reminders.

16 Claims, 23 Drawing Sheets

Edit Your Profile

Session reminder via email (minutes before session):

15 minutes before session

| Class | Time | Notifications |
|---|---|---|
| ECON 0110:Principles of Economics | MWF 9am-9:50am | Exams & Sessions |
| GRMN 0200:Beginning German | TTh 1pm-2:20pm | Exams & Sessions |
| CSCI 0150:Introduction to Object-Oriented Prog | M 3pm-5:30pm | Exams |
| ENCL 1050E:Sportswriting | MWF 1pm-1:50pm | Sessions |
| SOC 1315:Macro-Organizational Theory, Organi | TTh 6:40pm-8pm | None |

☐ Receive hourly comment notification emails for sessions you've joined?

Submit

Cancel

FIG. 6

Create A Session

151 — Class Name*
ex: CSCI 1420

152 — Professor*
ex: Prof. Reiss

153 — Date*

154 — Time*

155 — Purpose*
ex: Studying for midterm

156 — Location*
ex: SciLi

157 — Floor/Room*
ex: 4th floor Room 401

Notes
ex: Bring food

158 — Submit

FIG. 7

Create A Session

151 — Class Name*
ECON 0110 Principles of Economics

152 — Professor*
Prof. Smith

153 — Date*
08/29/2018

154 — Time*
7:30pm

155 — Purpose*
Study for exam #1

156 — Location*
Rockefeller Library

157 — Floor/Room*
Lobby

158 — Notes
Bring all your notes from class

Submit

GROUP STUDY SYSTEM

CROSS REFERENCE TO RELATED APPLICATION

This application claims priority to U.S. Provisional Patent Application entitled "GROUP STUDY SYSTEM," Ser. No. 62/609,473, filed Dec. 22, 2017, the disclosure of which is hereby incorporated entirely herein by reference.

BACKGROUND OF THE INVENTION

Technical Field

This invention relates to a group study system and particularly to a group study system to form study groups with classmates.

State of the Art

Students are often interested in forming study groups with fellow students but may not know their fellow students in their classes and/or related classes. Classes are often large and/or may even be offered online. Accordingly, a group study system matching students in the same classes or related classes is needed.

SUMMARY OF EMBODIMENTS

Disclosed is a group study system comprising: a server for running an application; and at least one computing device operated by a student, wherein the student selects a class and the application determines if at least one other same class student is studying and the location where the at least one other same class student is studying. If no other same class student is studying, the application may determine if at least one other related class student is studying and the location or virtual location where the at least one other related class student is studying. While it is discussed that the study sessions are for those in the same class, it will be understood that users may join study sessions for related classes or related subject matters and the like.

An embodiment includes a group study system comprising: a server having a memory for storing study session information, including class, date, time and location of at least one study session and user information for each user; and a first and second user computing device coupled to the server, the first and second user computing device each operating an application to access the system and couple to the server, wherein the server is programmed to: receive from a first computing device a signal including a request to create a study session, wherein the request includes a first study session information including a class, a date, a time and a location of the first study session; automatically process the request and create a first study session interface searchable and viewable by other user computing devices accessing the system; receive from the second user computing device a signal including a request to view detail of the first study session and automatically process the request and access stored study session information stored in the memory; automatically send details of the first study session for display on the second user computing device including a date, time and location of the first study session and a selectable option to join the first study session in response to analyzing the first study session information stored in the memory; and receive from the second user computing device a signal including a request to join the study session and process the request and add user of the second user computing device to the first study session, wherein all students joining the group are anonymous.

Another embodiment includes a group study system comprising: a server having a memory for storing study session information, including class, date, time and location of at least one study session and user information for each user; and a first and second user computing device coupled to the server, the first and second user computing device each operating an application to access the system and couple to the server, wherein the server is programmed to: receive from a first computing device a signal including a request to create a study session, wherein the request includes a first study session information including a class, a date, a time and a location of the first study session; automatically process the request and create a first study session interface searchable and viewable by other user computing devices accessing the system; receive from the second user computing device a signal including a request to view details of the first study session and automatically process the request and access stored study session information stored in the memory; automatically send details of the first study session for display on the second user computing device including a date, time and location of the first study session and a selectable option to join the first study session in response to analyzing the study session information stored in the memory, wherein the virtual location is an online audio/video conference; and receive from the second user computing device a signal including a request to join the study session and process the request and add user of the second user computing device to the first study session, wherein all students joining the group are anonymous.

Yet another embodiment includes a group study system comprising: a server having a memory for storing examination information; and a plurality of user computing devices coupled to the server, each of the plurality of user computing devices operating an application to access the system and couple to the server, wherein the server is programmed to: automatically store examination information including date and time of at least one examination of a class received from at least one user computing device of the plurality of user computing devices; automatically compare user information stored in the memory of the server with the examination information to determine that class information of the user information matches the class of the at least one examination of the examination information; and automatically send an alert to all user computing devices of the plurality of user computing devices with a matching class at predetermined times prior to the date and time of the at least one examination a notification reminding the user of the upcoming at least one examination.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 is a view of a Create Profile interface with fields filled out in accordance with an embodiment;

FIG. 6 is a view of an Edit Profile interface in accordance with an embodiment;

FIG. 7 is a view of a Create A Session interface in accordance with an embodiment;

FIG. 8 is a view of a Create A Session interface with fields filled out in accordance with an embodiment;

FIG. 21 is a view of an Upload Exam Information interface in accordance with an embodiment;

FIG. 22 is a view of an Upload Exam Information interface with fields filled out in accordance with an embodiment; and FIG. 23 is another view of an Upload Exam Information interface with fields filled out in accordance with an embodiment.

DETAILED DESCRIPTION OF EMBODIMENTS OF THE INVENTION

An application, as used herein, may include a mobile application and/or website. The application allows a student to form a study group with other students in their class and/or related classes. The application allows students to find other students to study with, including students they may or may not know. The application may allow students to arrange meeting places and/or to exchanges class materials. The application may also include advertising from related services, such as tutoring services, food delivery and/or ride programs.

The group study system was developed after discovering there is a need for students to have an online platform through which they can discover study groups. The group study system is especially valuable for first-year's or new students to a school who likely do not know most of their classmates. The group study system is also important for students in large, entry-level classes (such as Principles of Economics) who are likely in their first course for a given subject and might benefit from having other students to study with.

At present, to have someone to study with/ask questions, students must either use their personal network of classmates or seek out their professor and TA's (if applicable). Both of these can have significant difficulties. For one, it is often logistically difficult and awkward for students to arrange meetings with their professor or teacher's assistant. Students usually prefer to study with their classmates, but this is very difficult to do if the student doesn't know his/her classmates. With the group study system, no longer will students be stranded to study on their own if they don't have relationships with their classmates.

The group study system also allows students the freedom to create or join a study group very close to or before the time of an exam. For example, a student may be reviewing for an exam the evening before the test. If they realize they are unclear about a part of the material, they are stuck unless they know someone in the class who they can meet up with. That is no longer the case with the group study system. Until now, students would sit on different floors of the library, mere steps away from each other, struggling with their studies, but not having anyone to ask for help. This becomes extremely stressful if the exam is occurring soon. With the group study system, those students will have the ability to find one another and reap the benefits of studying together prior to the upcoming exam.

Figure 1:
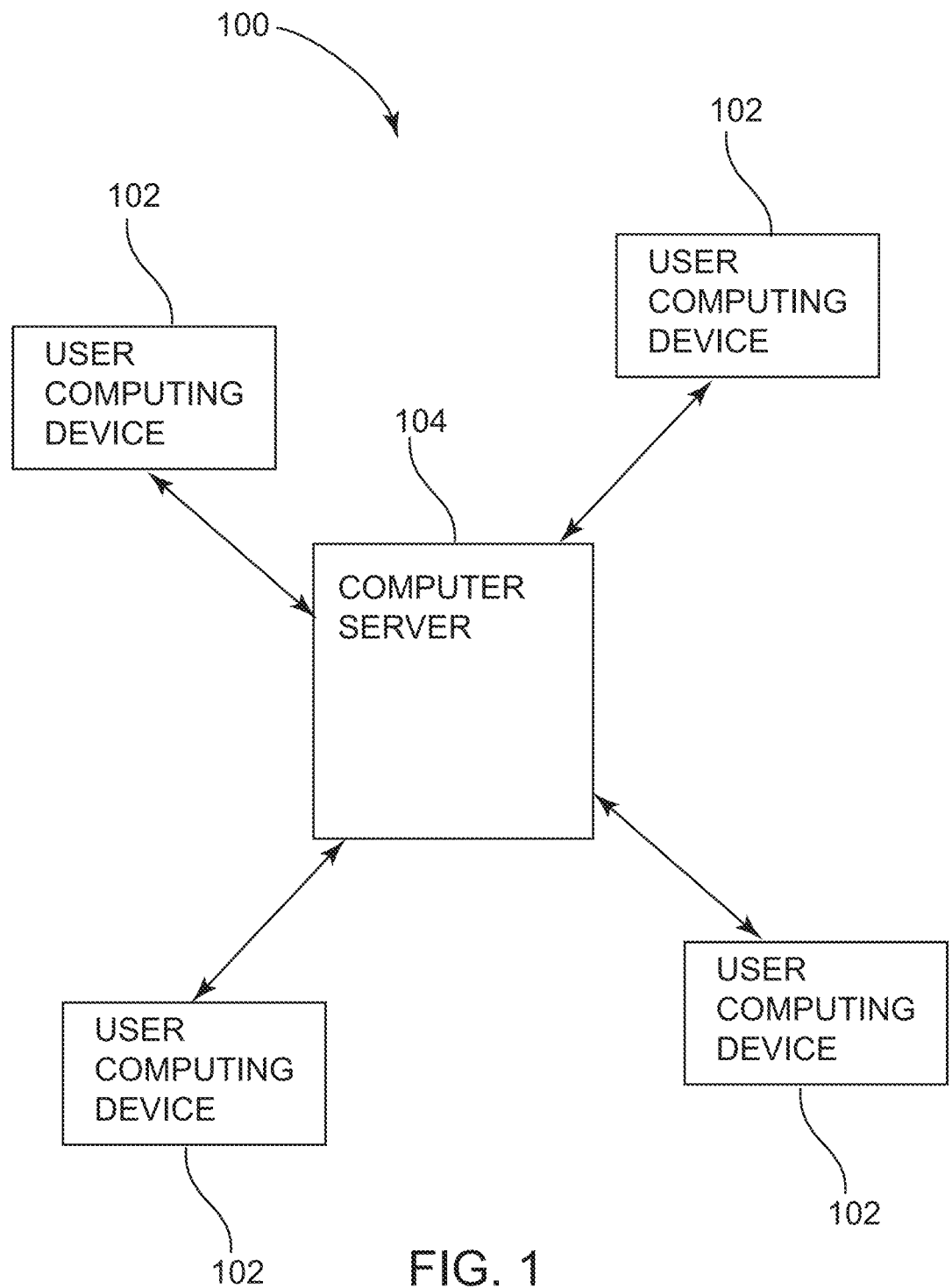
FIG. 1 is a diagrammatic view of a group study system in accordance with an embodiment.

Referring to the drawings, FIG. 1 depicts an embodiment of a group study system 100. The system 100 may include user computing devices 102 and a server 104, wherein the user computing devices 102 are coupled to the server 104. This coupling may be a network connection, such as through an Internet connection, wherein the user computing devices 102 may communicate with and receive communication from the server 104. The server 104 may include a memory storing user information and the application of the system 100, wherein the server executes the programmed instructions in the application during operation of the system 100.

In utilizing the system 100 a student may open and operate a web application, a software application, a mobile application or the like on the user computing device 102, such as, but not limited to computers, smartphones, tablets, and the like. The server 104 may be programmed to perform processing functions of the system and provide instructions to the mobile computing device 102 for display each of the interfaces discussed previously.

One important element of the system 100 is the established and system-controlled anonymity of the users. Users have the ability to access the system, search for study sessions, create study sessions and join study sessions while maintaining anonymity. This allows for creation of study groups that avoid drawbacks of current available means of establishing study groups. For example, anonymous study sessions remove the preconceived biases that individuals would have when they are aware of who is a part of the group session and thereby typically resulting in a student avoiding a study session that likely would help the student even with the student's preconceived biases. Additionally, it allows a user to create or find a study group during a time that is convenient for the user as opposed to balancing and considering multiple people's schedules in order to set up a study session like is needed by students currently to schedule a study session with a known group of individuals. This allows each user to rely on their own schedule and not on the schedules of others to find a study group. This allows for users to plan around their schedule and not shift their schedules to meet other study schedules.

In operation, when a study session is created, the server 104 may be programmed to automatically generate a confirmation message and send the confirmation message for display to the user computing device 102 utilized to create the study session. Additionally, upon joining a study session, the server 104 may be programmed to automatically generate a confirmation message and send the confirmation message for display to the user computing device 102 utilized to join the study session. The confirmation may also be sent or alternatively sent as an email or a text message to the user computing device 102.

Figure 17:
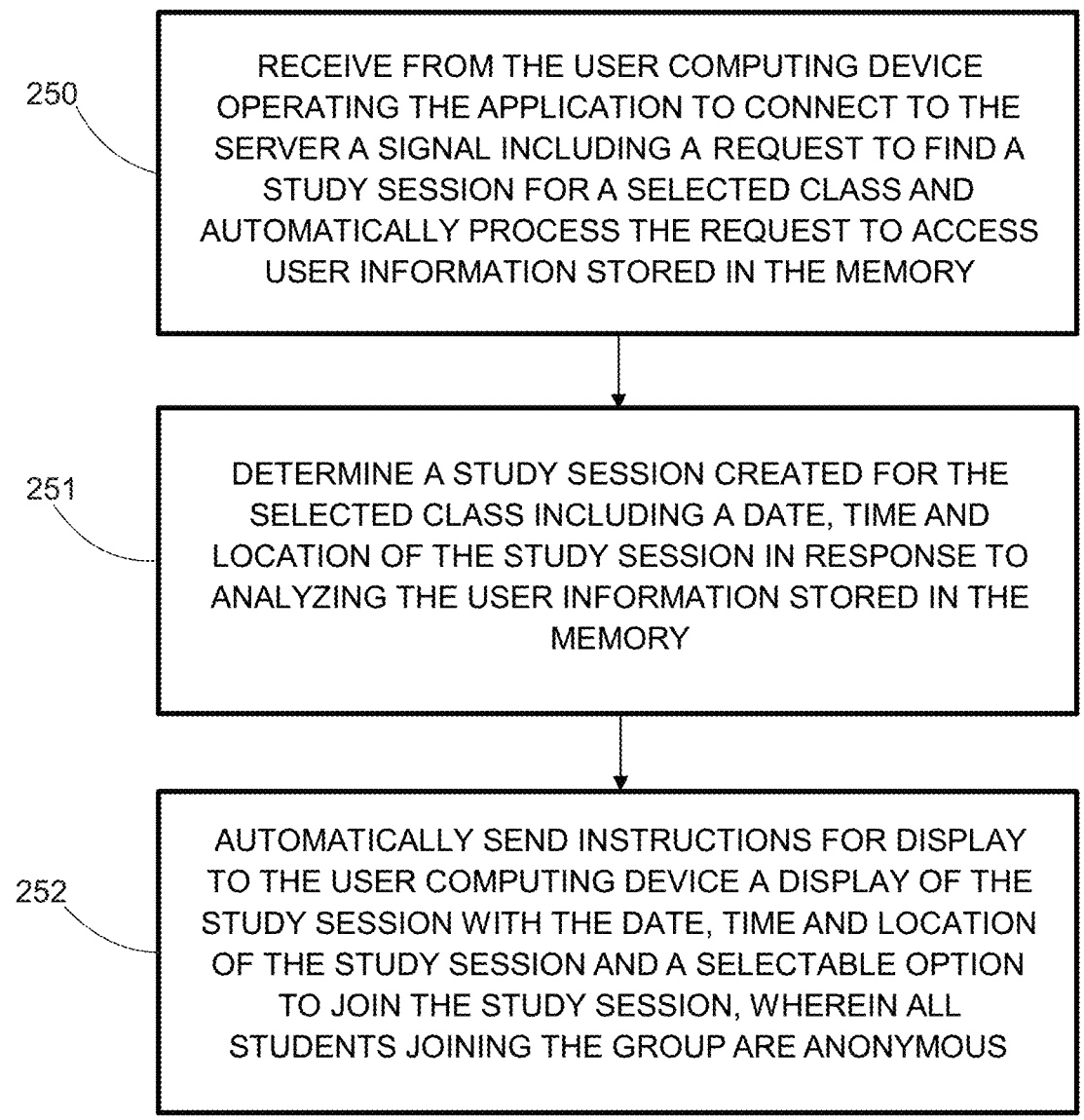
FIG. 17 is a flow chart depicting programming for execution by a server of the group study system.

In operation, the system 100 may include a server 104 having a memory storing user information and a user computing device 102 coupled to the server 104. The user computing device 102 may be operating an application to access the system 100 and to couple the mobile computing device 102 to the server 104. As shown in FIG. 17, The server may be programmed to: receive from the user computing device a signal including a request to find a study session for a selected class or similar subject topic and automatically process the request and access stored study session information stored in the memory (Step 250); automatically determine a study session created for the selected class or similar subject topic including a date, time and location of the study session in response to analyzing the study session information stored in the memory (Step 251); and automatically send instructions for display to the user computing device a display of the study session with the date, time and location of the study session and a selectable option to join the study session, wherein all students joining the group are anonymous (Step 252).

In embodiments, the system 100 may include the server further programmed to: automatically store examination information including date and time of at least one examination of a class received from any user computing device of the system. Users with accounts, users without accounts, parents, professors, tutors and other third-party individuals may access the system 100 and see the exam schedules for all examination information stored in the memory of the server 104. The system 100 may also be utilized to notify users with accounts, wherein the server 104 may be programmed to automatically compare user information of a particular user with the examination information stored in the memory of the server to determine whether the class information of the user matches the class of the at least one examination of the examination information; and automatically send an alert to the user computing device of the particular user at predetermined times prior to the date and time of the at least one examination, thereby reminding the user of the upcoming at least one examination. The alert may be in any type of form, such as, but not limited to email, text and/or push notifications.

Examination reminders are an important element of the system 100. Universities and colleges have a finals schedule that is typically established by the registrar. However, all other exam dates, times and locations are typically professor determined. The system 100 allows for multiple users, in a crowd sourcing of information, to upload examination information for various classes, whether the user is a member of the class or not. The system then, based on the user information, including the classes listed and enrolled under the user, can alert the user of exam dates and times. The system includes verification of information by comparing multiple entries of exam dates and times, wherein the system 100 determines the most common date if there are variances and utilizes the most common as the verified exam date and time. Third parties can view this information, such as parents and other teachers. Tutors may be able to view the exam dates and offer their services, such as tutor led study sessions, wherein users may select for a fee. It ultimately allows the user to have all dates in front of him or her in one location—something that is currently widely unavailable.

In embodiments, the server 104 may be further programmed to determine a number of students who have joined the study session and send instruction to the user computing device for display the number of students who have joined the study session.

In embodiments, the server 104 may be further programmed to determine location directions of the study session location and send instruction to the user computing device for display the location directions to the study session.

In embodiments, the user information includes grade point average stored in the memory of the server 104. In such embodiments, the server 104 may be further programmed to determine an average grade point average of all students who joined the study session and send instruction to the user computing device for display the average grade point average of students who have joined the study session.

It is understood that the prominence of online higher education is rapidly growing. The number of online students enrolled at degree-granting postsecondary institutions is over 6 million students. There is a growing need for online students to have opportunities as conventional university students to engage in study sessions or study groups in order to further their education. In fact, there are advantages of learning in a shared physical space. Some institutions are forming hybrid type models that allow online students to engage with each other in a shared physical space. Embodiments of the system 100 operate perfectly for such a hybrid model, easily connecting students from various locations within a general same area for in person study sessions in a shared physical space. These shared physical spaces may be coffee shops, underutilized co-working spaces, restaurants and the like to bring additional traffic and potential customers to business that otherwise may have "dead time" or less customer traffic.

The hybrid model is not practical for all areas, and virtual shared space is a solution that is contemplated with the present invention. This allows real time, auditory and visual interactions with other students studying the same or similar material, and who are generally in a similar place in life for relating with one another. These embodiments are particularly useful for students on online colleges, allowing them to interact virtually with students around the country or around the world.

Embodiments of this system 100 address this need. For example, Step 251 includes determining a location of the study session, wherein the location of the study session may be a virtual location such as an online audio/video conference. Further, in this embodiment, the server 104 may be further programmed to determine location directions of the study session location and send instruction to the user computing device for display the location directions to the study session, wherein the location directions include a link to the online audio/video conference.

In all embodiments, the system 100 may provide for a "check-in" capability, wherein the users attending a study session that he or she has joined may check-in. The check-in to study session may be manual by the user with the user computing device 102 accessing the system, may include a geofence provided by the server 104 of the system 100, wherein the user computing device 102 is recognized when entering the geofence and the server automatically checks-in the user computing device 102, or any other form of manual or automated check-in means, such as scanning a code displayed on the user computing device 102 of the study session creator or the like. Additionally, in embodiments that include a virtual location for an online study session, accessing the online study session or virtual location results in the server automatically checking-in each user computing device 102 that accesses the online study session.

The system 100 may then operate to improve study capabilities of all users attending a study session, wherein the system 100 provides a platform for sharing study media between all users who attended the study session. The system 100 allows users to upload media using user computing devices 102 for storage on the server 104 and makes it accessible by the other user computing devices 102 of the study session members that have checked in. In at least this way, checking in enables certain benefits to users that join and attend study sessions, such as, but not limited to, shared media pages, like mutually created study guides, photos of white board notes during the study sessions, notes, study material and the like.

Another benefit the system 100 may provide users is that check-in to a study session may be rewards, awards and other benefits to users that create, join, and attend study sessions. These rewards, awards, and benefits may include discounts to local or nearby businesses, points redeemable for other benefits including discounts, merchandise, and the like.

Additionally, the system 100 may allow for the users to rate study partners, wherein each participant can rate others in a study session. The rate may be a scale of 1 to 5 or a scale of 1-10 or any other type of rating scale. The system 100 may operate to display the average participant rating in the details of a study session created, wherein the average rating is updated as additional participants join the study session without disclosing the participants' identities.

In operation, the system 100 may include various types of user interfaces to access the system 100 from the user computing device 102 and interact with the server 104 to operate the system 100.

Example Platform Embodiment

The group study system is an anonymous platform for students to find and form group study sessions, as well as receive reminders before exams. The group study system allows students to join study sessions that have been created by other students. If a student does not find the study session they're looking for, they can create a new session by specifying the class, professor, purpose of the study session, as well as the date, time, and location of the study session. Upon creating this study session, other students can see it and have the ability to join. The group study system sends confirmations and reminders to students for study sessions they've registered for. The group study system may be a platform that connects students, so they can benefit from studying together. If enabled, the group study system also sends students reminders before the exams in their classes; this is accomplished by crowdsourcing exam data from students.

The following is a description of various interfaces that may be utilized as part of an exemplary form of an embodiment of the group study system. This is not intended to be a limitation to the system, but rather is provided in order to depict a possible embodiment. It will be understood by one of ordinary skill that variations may be made with regard to this example platform without departing from the scope of the claims.

Figure 2:
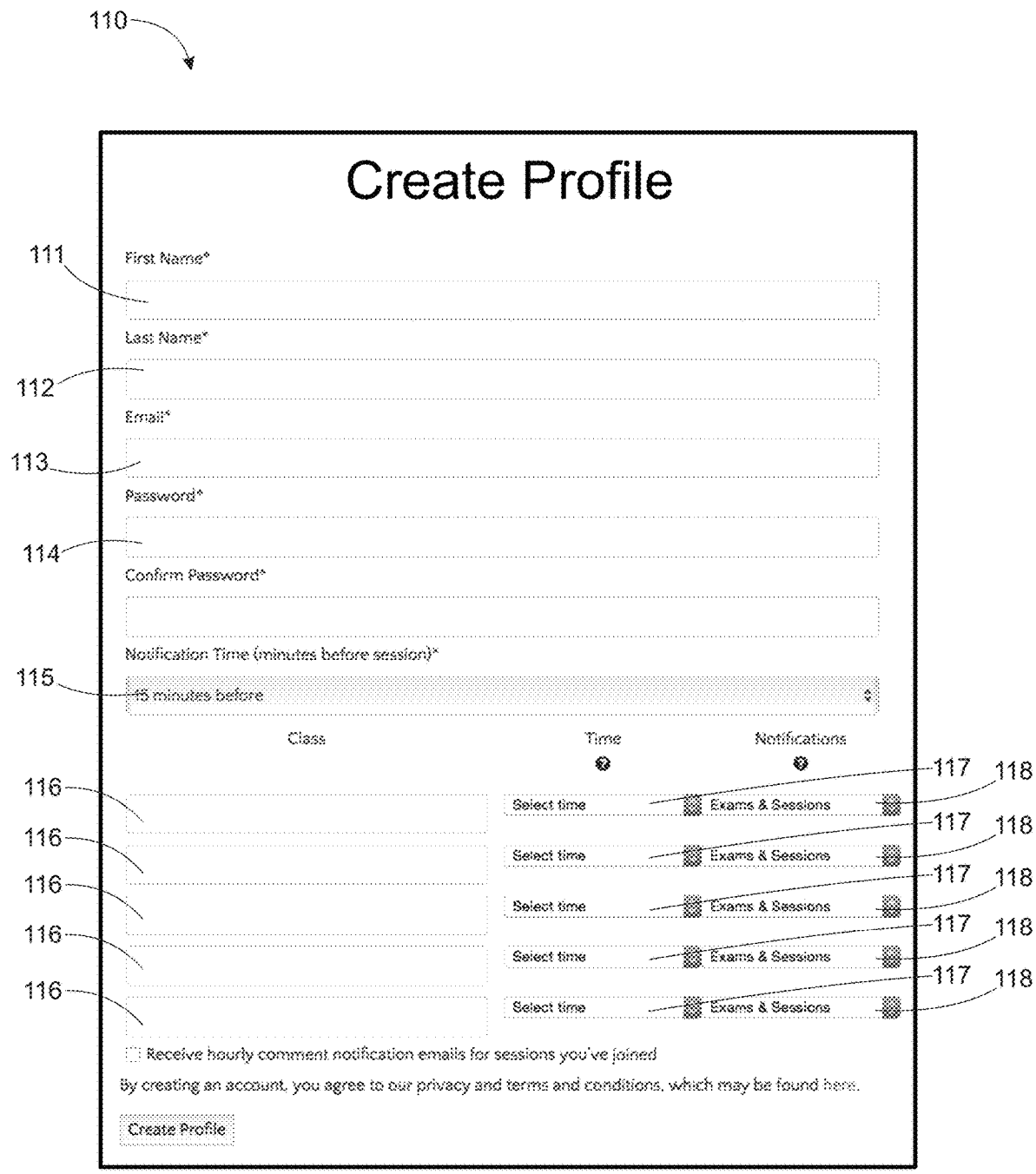
FIG. 2 is a view of a Create Profile interface in accordance with an embodiment.

FIG. 2 depicts a create profile interface 110 according to an embodiment. The create profile interface 110 is the interface displayed on the user computing device 102 that allows the user to create his or her profile. A profile is required to "Join a Session," "Create a Session," or access most of the functionality on the website.

The create profile interface 110 may include required fields, such as, but not limited to First name 111; Last name 112; Email 113; Password/confirm password 114; Notification time 115 (minutes before session); and grade point average. Additional, but not required fields on the create profile interface 110 include fields where the user puts his or her: Classes 116 (when the user begins typing in the field, the list of courses from the school begins auto populating and the user can choose the applicable course); For each class, the user may choose the time slot 117 (ie: MWF 10-10:50 am); however, there is the option at the bottom of the dropdown for "Prefer not to answer." The system 100 asks the user to enter the time slot 118 because some courses have multiple class sections that meet on different schedules. As such, not all class sections for a single course will have exams on the same day; therefore, the system accounts for such variances and determines which section the user is in so that we can send him or her reminders before the exams that correspond to their class section.

For each class, the user may choose which types of notifications 119 the user may want to receive. Options include: Exams—if chosen, a user will receive an email reminder at predetermined times before the exam, such as, but not limited to 3 days and 24 hours before exams in that class; Sessions—if chosen, a user will receive immediate email notifications when a session is created (by anyone) for that class; Exams & Sessions—user will receive both of the above; None—user will receive neither of the above.

Figure 3:
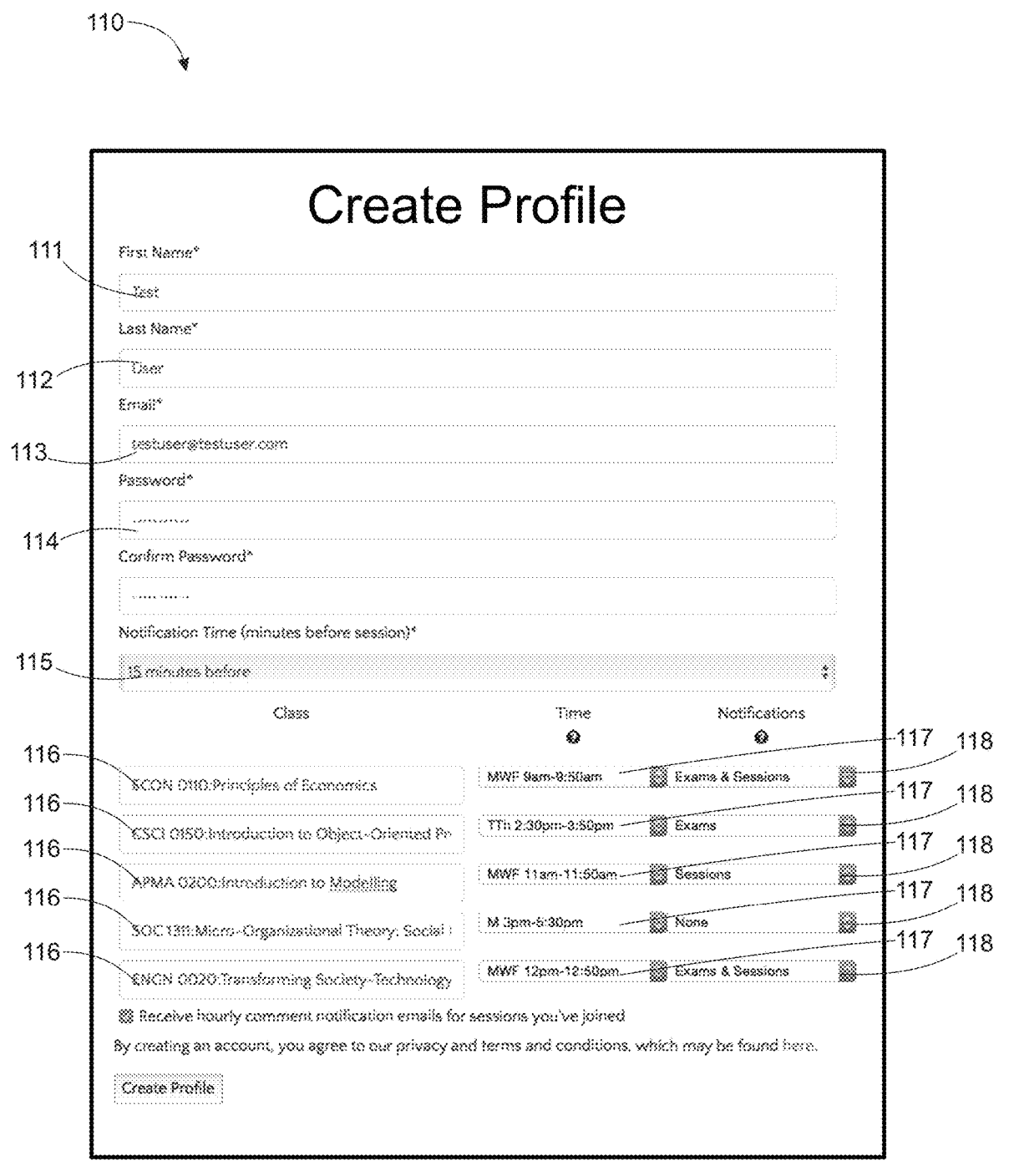

FIG. 3 depicts an example of the create profile interface 110 with the various fields filled in by a user. It should be understood that the create profile interface 110 depicted in FIGS. 2 and 3 is for exemplary purposes only and not as a limitation.

Figure 4:
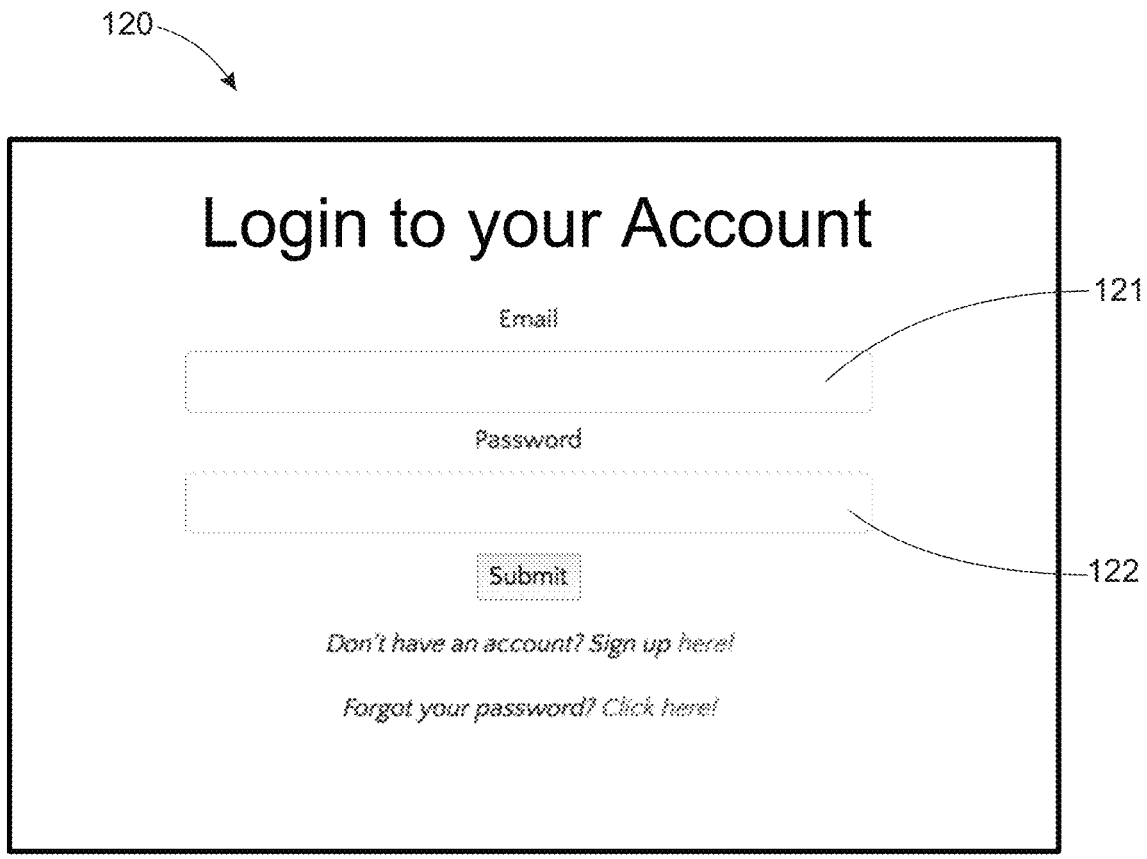
FIG. 4 is a view of a Login interface in accordance with an embodiment.

Referring further to the drawings, FIG. 4 depicts a login interface 120 according to an embodiment. The login interface 120 is used by a user to login to the user's account. This may be accomplished by the user entering an email address 121 and password 122. The login interface 120 may include a link to create an account, and a link for a forgotten password. Logging in allows a user to access the login-protected parts of the system platform 100.

Without an account, a user can: a) See and search through sessions already created and listed on the Upcoming Sessions/Find a Session page; b) View details for those sessions (including comments) by clicking on a session card; and c) View the exam schedules page that shows the schedules of exams for classes (as based off data inputted by users). Without an account, the user cannot: a) Create a new Session; b) Join a Session; c) Comment on a Session; d) Create a Profile; e) Edit Profile; and f) Upload exam details/schedules for classes.

Figure 5:
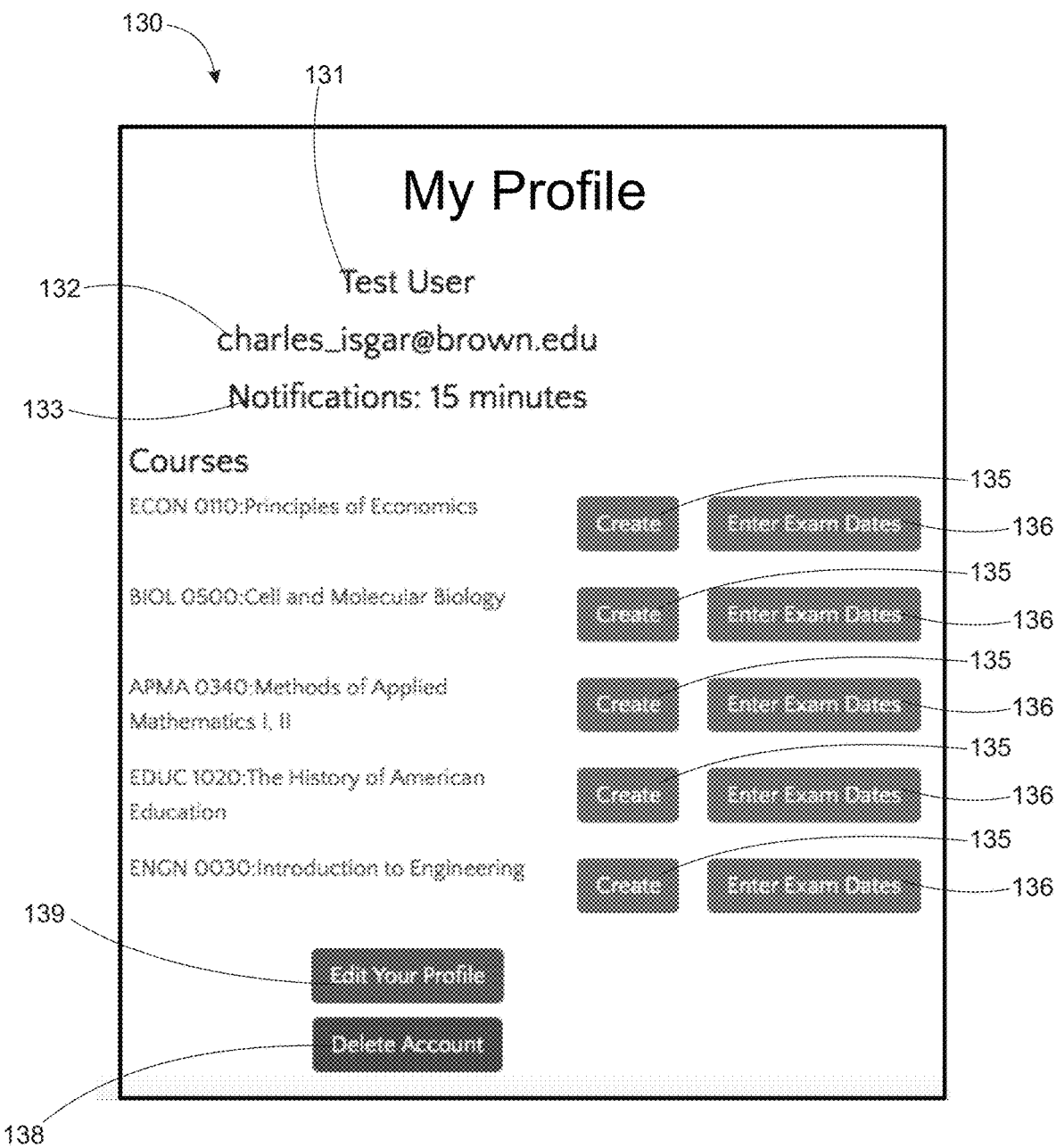
FIG. 5 is a view of a Profile interface in accordance with an embodiment.

Referring to FIG. 5, depicted is a profile interface 130 according to an embodiment. The profile interface 130 displays the user's name 131, email address 132, and notification time 133 at the top. The user notification time 133 is the length of time before sessions (for which the user registered) that the user may want to be notified via email. Notification times may range from 15 minutes to 24 hours before the session. The profile interface displays the user's courses, with "search," "create," and "exam info" buttons 134, 135 and 136 next to them.

By clicking the "search" button 134, the user will be brought to a Find a Session page with that course title already filled into the search bar (in other words, the user will only see sessions that have been created for that course title).

By clicking the "create" button 135, the user will be brought to the Create a Session interface 150, shown in FIG. 7, with that course title already filled into the "course" field 151 on the Create a Session interface 150.

By clicking "exam info" button 136 the user will be brought to the page where the user can upload exam details for that class.

Clicking the Delete Account button 138 will cause a user's account to be deleted. Clicking the "Edit Profile" button 139 will bring the user to a page where they can edit their profile.

Referring to FIG. 6, depicted is an Edit Profile Interface 140. This allows a user to edit his or her notification time (the length of time before sessions for which the user registered) that the user wants to be notified via email. The user can edit his or her classes (which will, as before, auto-populate when the user begins typing them in). A user can edit the time during which the class meets and his or her notification preferences for that class.

FIG. 7 depicts an embodiment of a Create A Session Interface 150. The create a session interface 150 allows a user to create a new study session. To create a Session, the user must have an account and be logged into the account. To Create a Session, the user inputs the following details: a) Class name 151 (which will, as before, auto-populate when they begin typing the course name/code in); b) Professor 152; c) Date 153 (which, when the user clicks into the field, the user may choose the day from a calendar popup); d) Time 154 (which, when the user clicks into the field, there is a dropdown menu with times on the quarter hour, or the user can manually type in any time); e) Purpose 155 (such as "Studying for midterm); d) Location 156 (which, for example, the user could choose Rockefeller Library); e) Floor/Room 157 (which is where the creator of the session will put the exact spot within the "location" that they plan to meet for the session; example: "4th floor Room 401"); and f) Notes 158 (this is the only optional field on the form, but a person might use it to specify any other details, such as what to bring—example: "bring your class notes" or "bring food," etc.). Upon hitting submit and creating the session, the session will be: a) Added to the creator's My Session page; b) Added to the Find a Session/Upcoming Sessions page that is viewable to anyone (whether or not the user has an account); and c) Additionally, the session creator will receive a confirmation email with the session details.

Referring to the drawings, FIG. 8 depicts an embodiment of the Create A Session Page 150 with the various fields filled in. This is depicted as an example only and not as a limitation.

Figure 9:
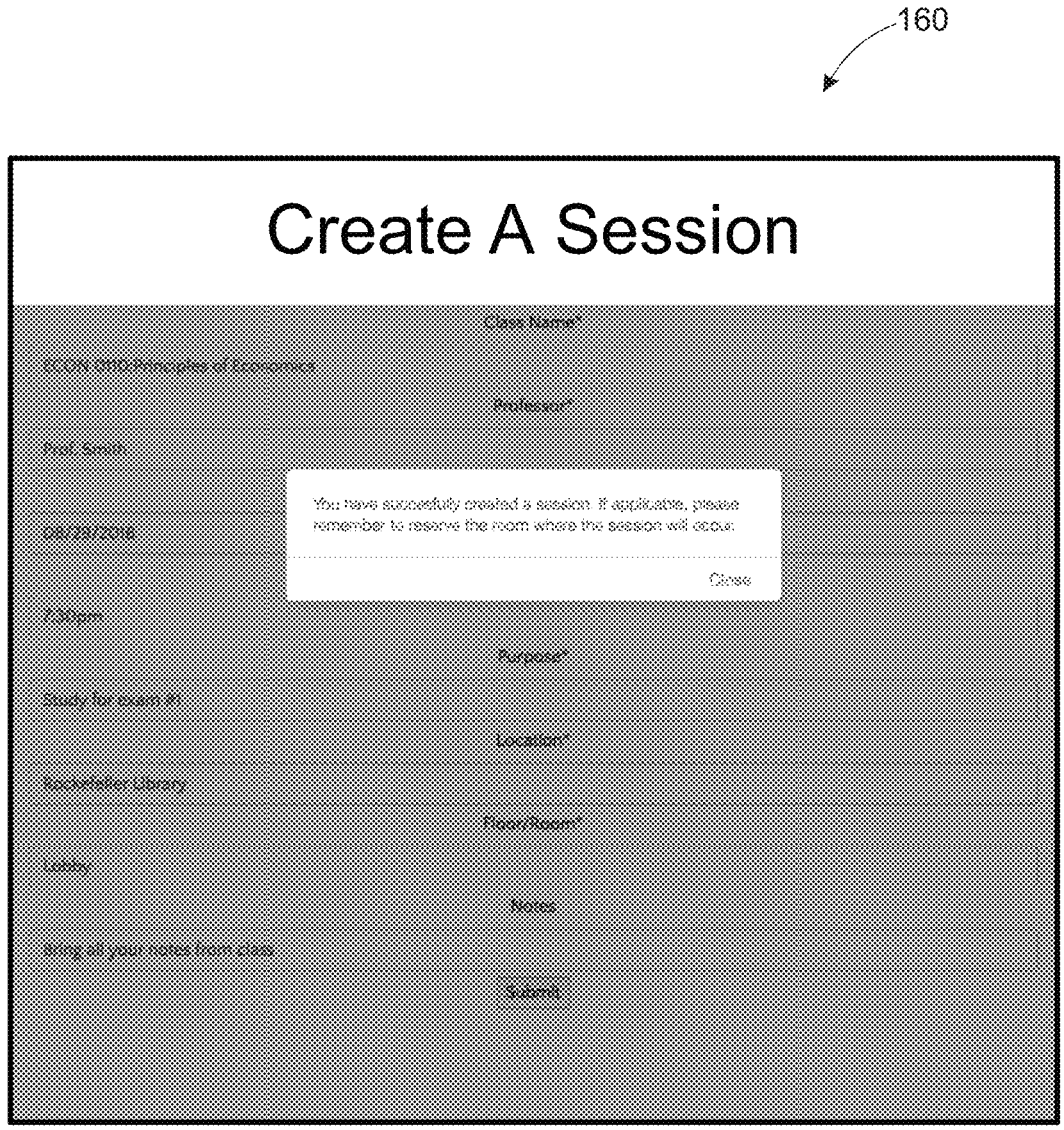
FIG. 9 is a view of a created session notification in accordance with an embodiment.

FIG. 9 depicts a Notification Upon Creating Session interface 160. This is an embodiment of the notification that appears to a User upon inputting the details for the session and hitting submit. For example, the notification may state, "You have successfully created a session. If applicable, please remember to reserve the room where the session will occur." Upon creating the session, the session will be: a) Added to the creator's My Session page; b) Added to the Find a Session/Upcoming Sessions page that is viewable to anyone (whether or not the user has an account); and c) Additionally, the session creator will receive a confirmation email with the session details.

Figure 10:
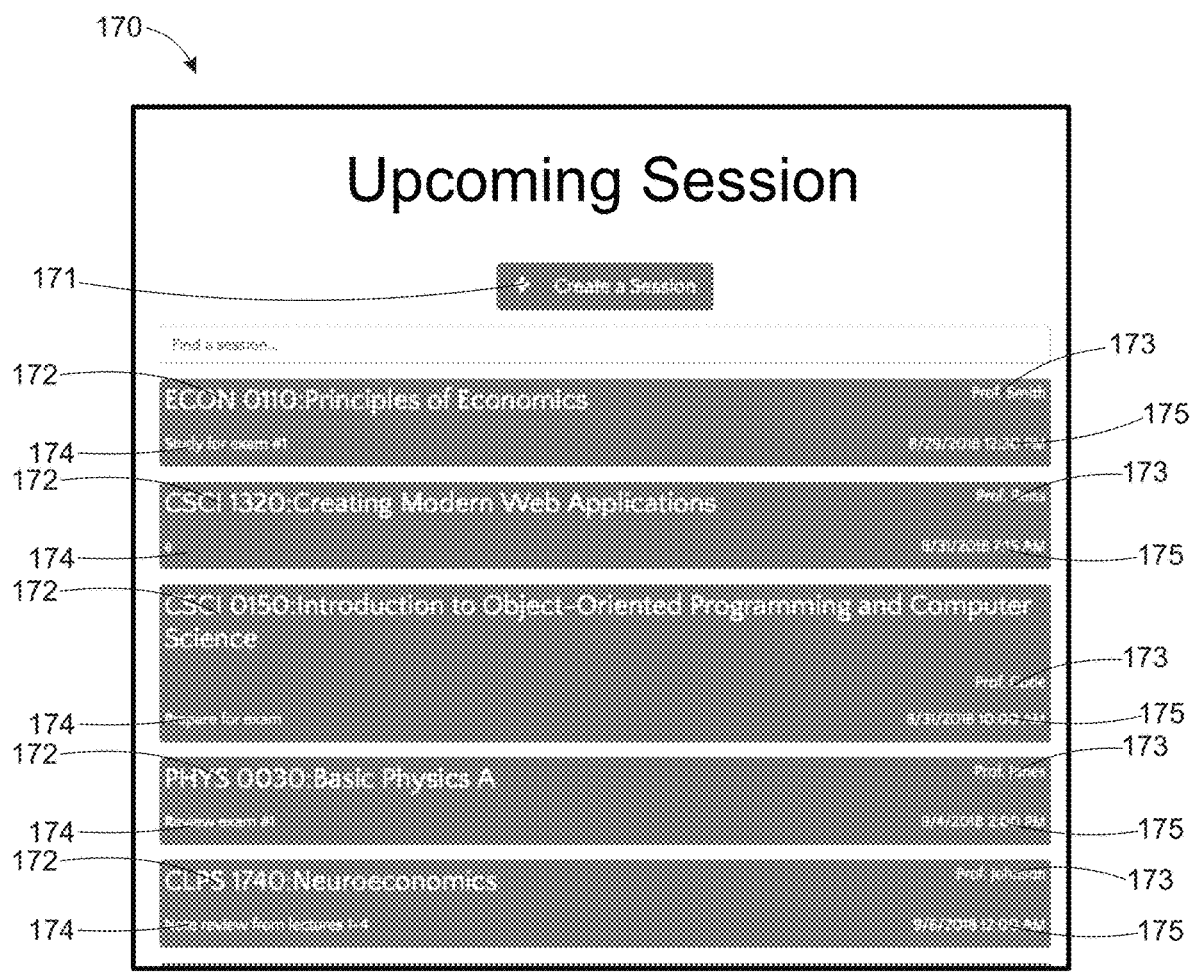
FIG. 10 is a view of an Upcoming Sessions interface in accordance with an embodiment.

FIG. 10 depicts an Upcoming Sessions/Find a Session Interface 170. A user does not need an account or need to be logged in in order to see the Upcoming Sessions/Find a Session interface 170. On the top of the Upcoming Sessions/Find a Session interface 170 is a button 171 that says, "Create a Session." Clicking on that button 171 will bring the user to the Create a Session interface 150. If the user is not logged into his or her account, clicking the button will bring the user to the Login interface 120. Right below the "Create a Session" button 171 is a search bar that has the text "Find a session . . . " By clicking into that field, the user can begin typing his or her course code/course title and the directory of courses will auto-populate and narrow based off what the user has typed in. Once the user/searcher chooses a course, they will see all sessions that have been created for that course. If no sessions have been created for that course, then they will see no results.

On the Upcoming Sessions/Find a Session interface 170, the user can see "cards" or other objects located on the interface 170 for the different sessions that have been created. Users cannot see who created the session or who else has joined the session. At no point, anywhere on the website, can anyone see who has created the session or who has joined a session. The cards for a session include the following details: a) Course title 172 (top left); b) Professor 173 (top right); c) Session details 174 (bottom left); and d) Date and time 175 (bottom right). A user can click on a session card (anywhere within the gray box), and it will bring up a box with detailed info about that session (see FIGS. 13 and 14).

Figure 11:
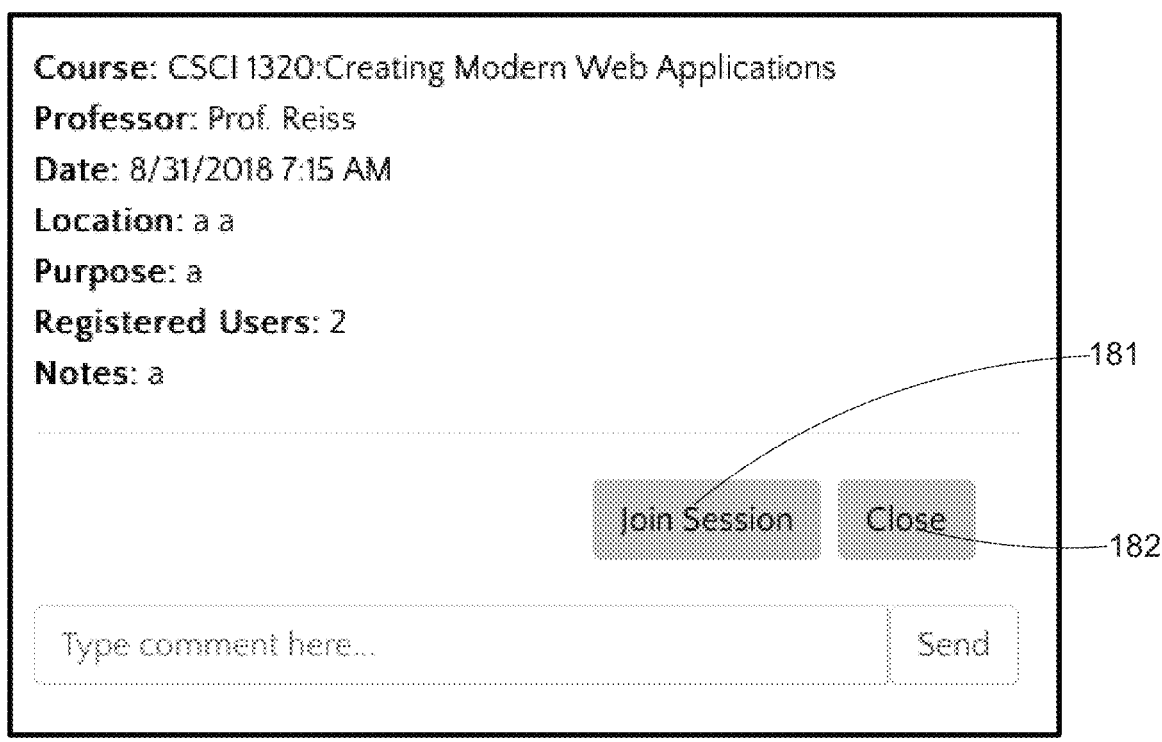
FIG. 11 is a view of a Join Session interface in accordance with an embodiment.

Referring to the drawing figures, FIG. 11 depicts an embodiment of a Join Session interface 180. Upon clicking a session card on the Find a Session/My Profile page, a box will pop up with details about that session. At the bottom of that card there will be buttons 181 and 182 for "Join Session" and "Close." By clicking on the "Join Session" button 181 (while the user is logged into his or her account), the session will be added to the My Sessions page. The user will receive an email notification confirming that the user has joined a session (and the details for the session will be included in the email). Upon joining the session, the user can then leave comments on the session.

Figure 12:
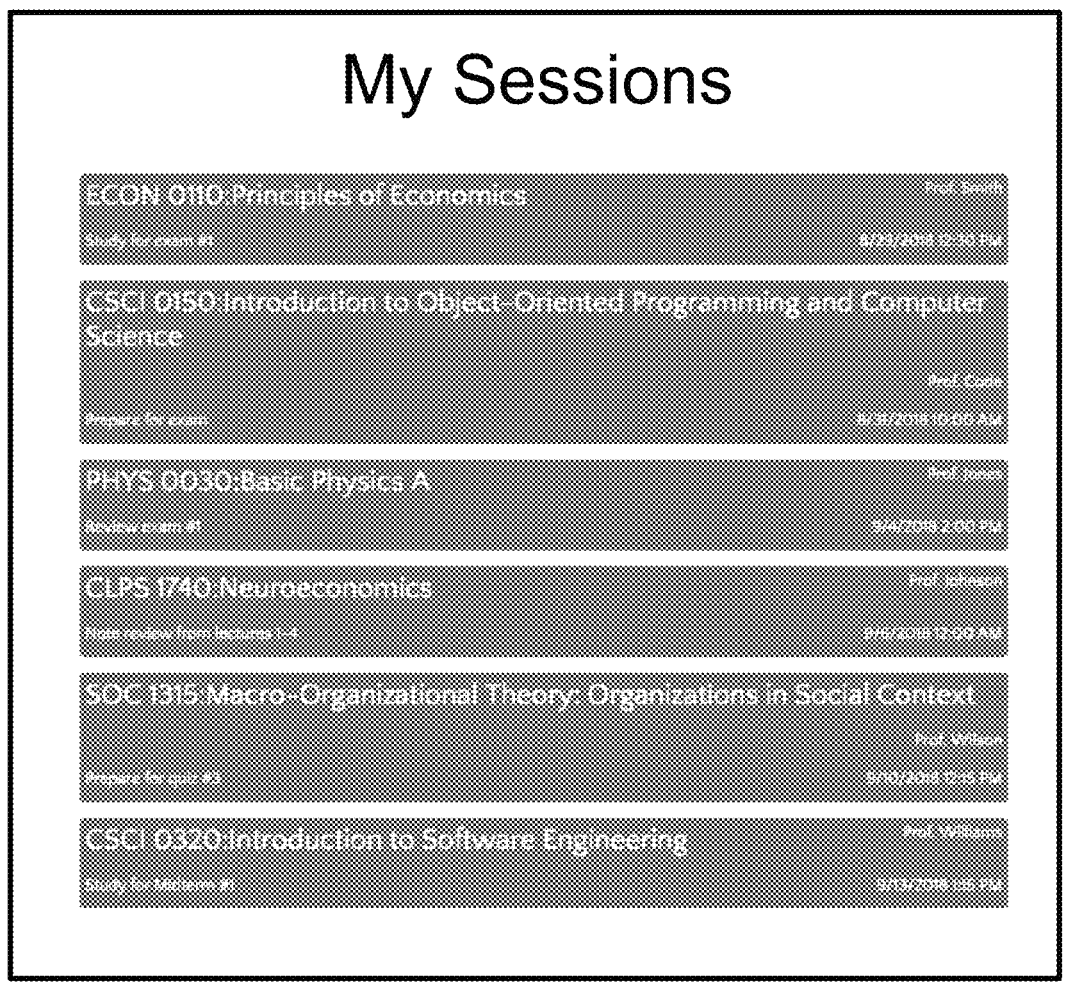
FIG. 12 is a view of a My Sessions interface in accordance with an embodiment.

FIG. 12 depicts an embodiment of a My Sessions interface 190, that depicts all sessions that the user has either "joined" or created. The user may click on session cards on the My Sessions interface 190 in the same way that he or she can click on session cards on the Find a Session/Upcoming Sessions interface 170.

Figure 13:
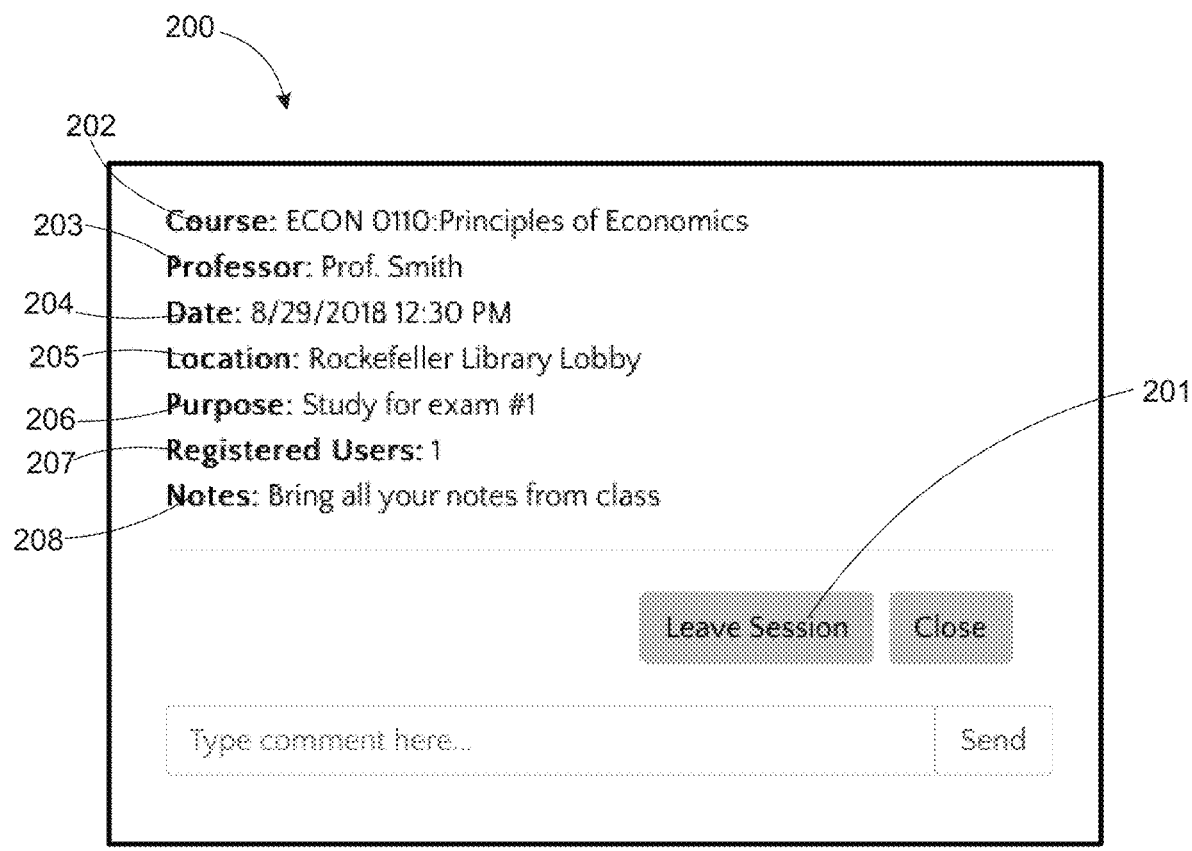
FIG. 13 is a view of a Session Details interface in accordance with an embodiment.

As depicted in FIG. 13, an embodiment of a Session Details interface 200, or a session card, is displayed in response to clicking on a session card on the My Profile interface 130. The session details interface 200 displays the details for the session. The information on this card is the exact same as what appears on the card when clicking on it from the Find a Session/Upcoming Sessions interface 170; the only difference is that, at the bottom, it says "Leave Session" instead of "Join Session". By clicking the "Leave Session" button 201, the user will be removed from the session and the session card will be removed from the My Sessions interface 190.

Fields/text on the session card 200 include the following: a) Course 202; b) Professor 203; c) Date 204 (which combines the date and time fields); d) Location 205 (which combines the location and floor/room fields); e) Purpose 206; f) Registered users 207 (this count displays the number of users that have "joined" the session); and g) Notes 208. All of the above info (minus the registered users) is reflective of what the session creator indicated when he or she created the session. The information cannot be changed by the session creator, nor anyone who joins the session. This ensures that once a session is created and joined that no changes can be made since all who have joined have done so because it fits within their schedule or they have adjusted their schedule to attend this session.

Figure 14:
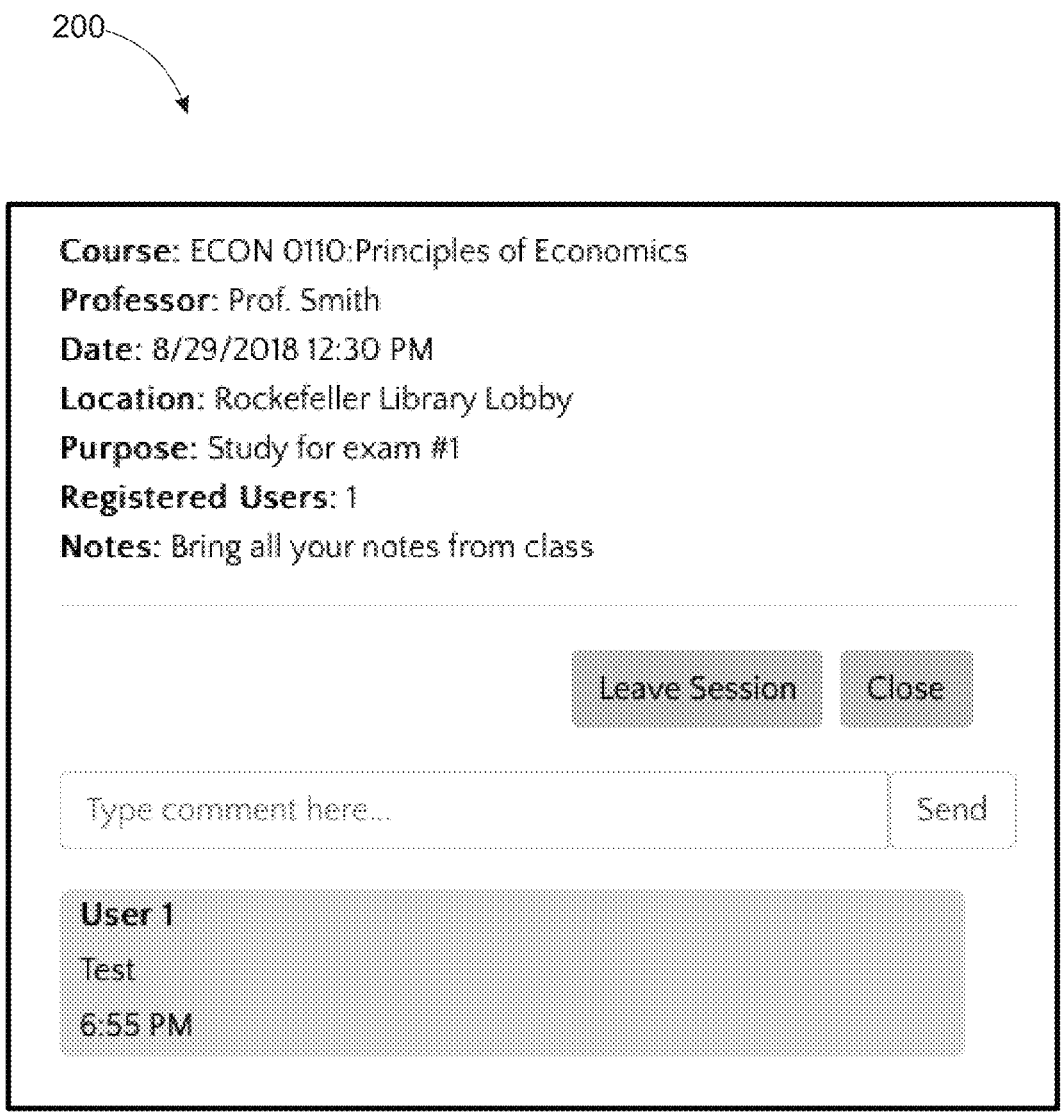
FIG. 14 is a view of a Session Details interface with a comment entered in accordance with an embodiment.

FIG. 14 depicts a commenting feature on session cards 200. Comments are public to view since they can be viewed by clicking the session card 200 on the Find a Session/Upcoming Sessions interface 170. Only users who have joined the session can leave comments and comments are anonymous. However, if a user leaves multiple comments, the user will hold his or her user #tag. For example, and without limitation, if a user leaves the first comment on a session, she will be User 1. The next person who comments is User 2. If the User 1 comments again, the comment will still be identified as coming from User 1. Further, the time and date of comments is recorded. Comments may be used for a session attendee to indicate where they are sitting, what they are wearing (for other people to find them), etc. The comments could also be used to share a change in location for the session or other change/modification.

Figure 15:
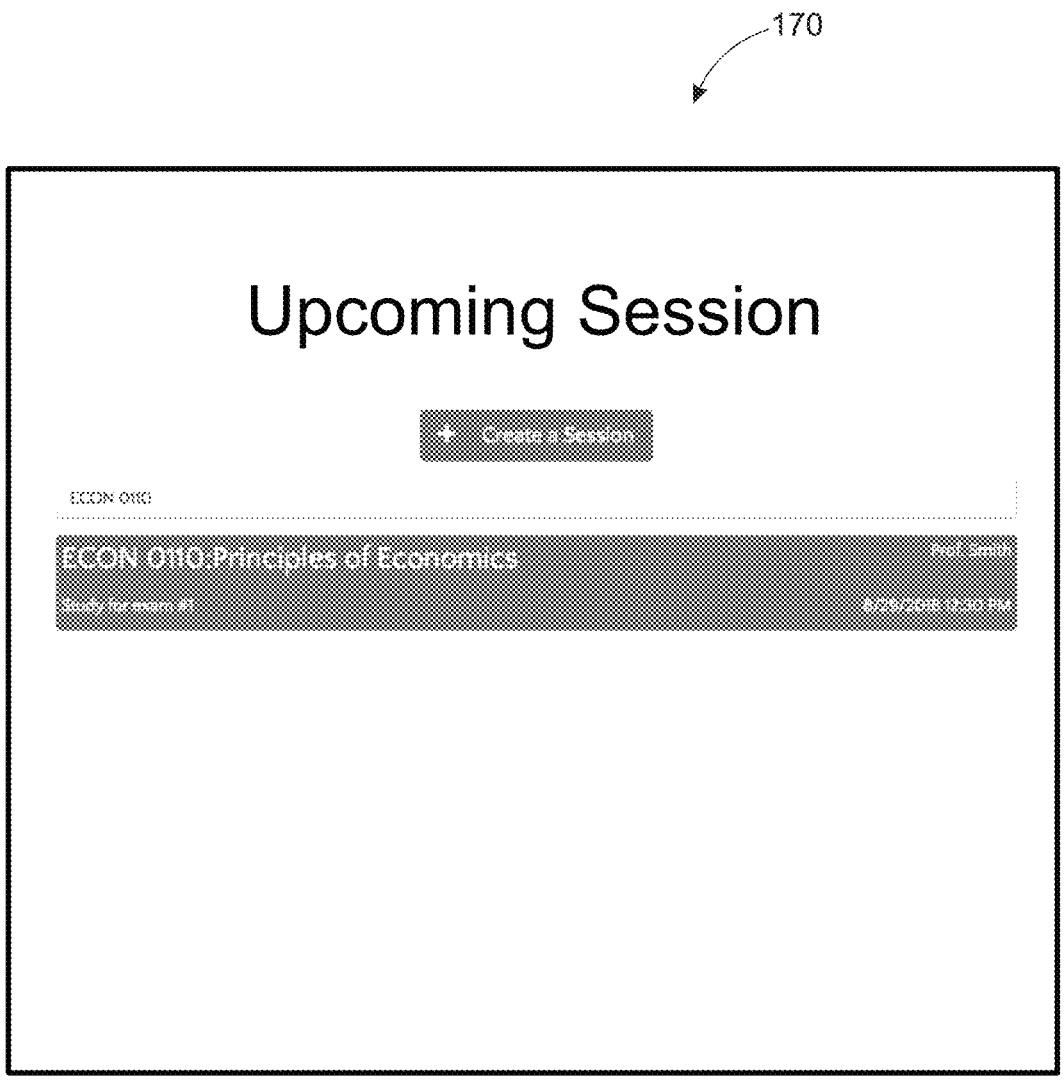
FIG. 15 is a view of an Upcoming Sessions interface in accordance with an embodiment.

FIG. 15 depicts an embodiment of the Find a Session/Upcoming Sessions interface 170 using the search bar. In this case, the user is searching for the class ECON 0110. As the user types, session cards disappear that do not match what the user is typing. Anyone (users and nonusers) can use the search bar since the Find a Session/Upcoming Sessions interface 170 is public.

Figure 16:
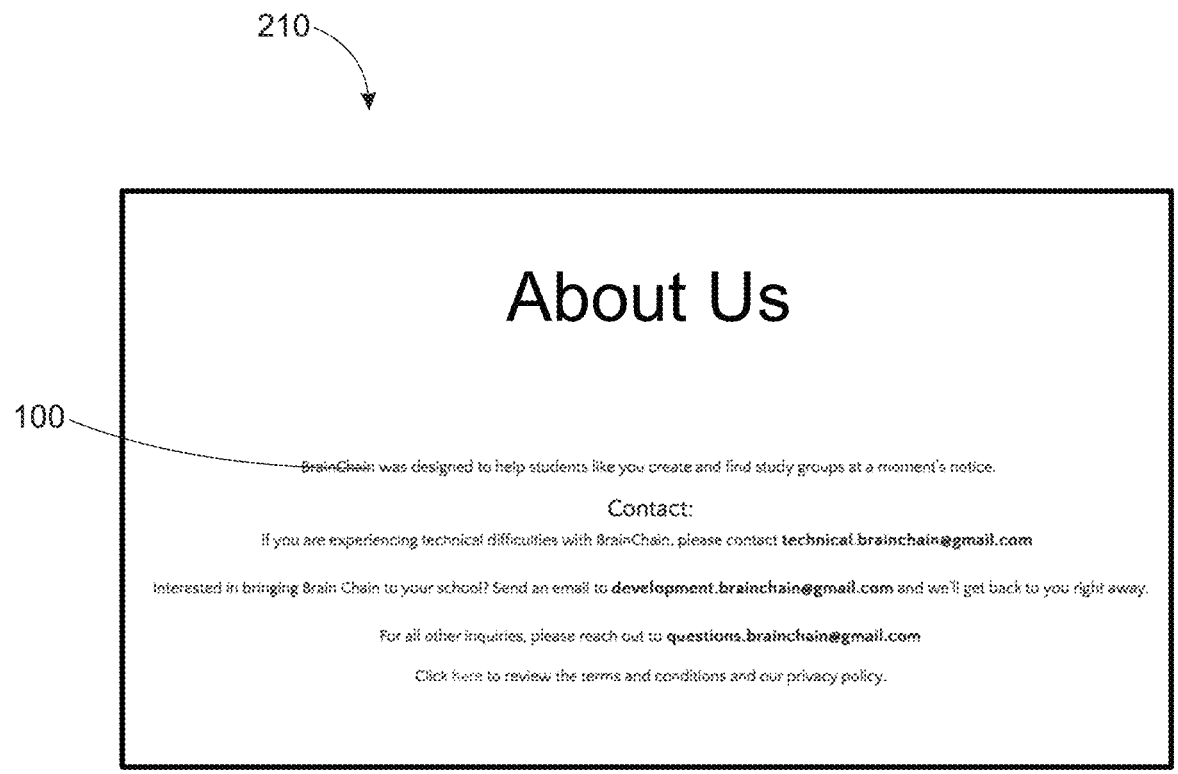
FIG. 16 is a view of an About interface in accordance with an embodiment.

FIG. 16 depicts an About interface 210 that is an informational page. It includes: a) A short description about the system 100; b) Contact information; c) A link to the terms and conditions and privacy policy; and d) a Frequently Asked Questions section.

Figure 18:
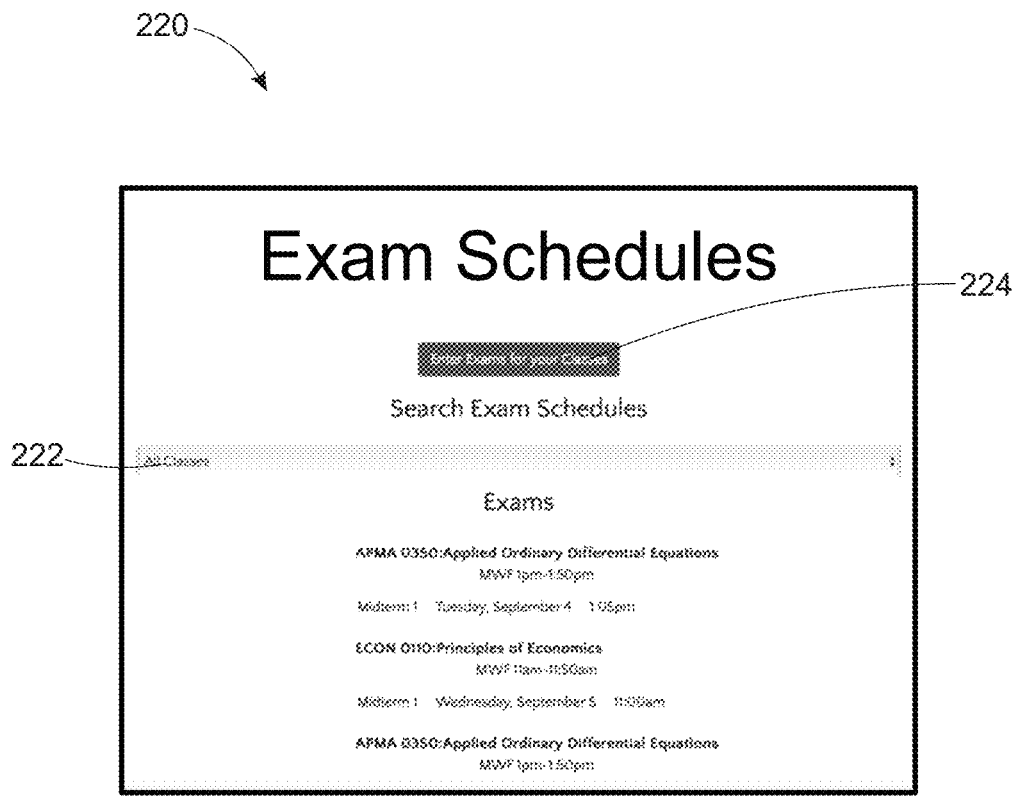
FIG. 18 is a view of an Exam Schedules interface in accordance with an embodiment.
Figure 19:
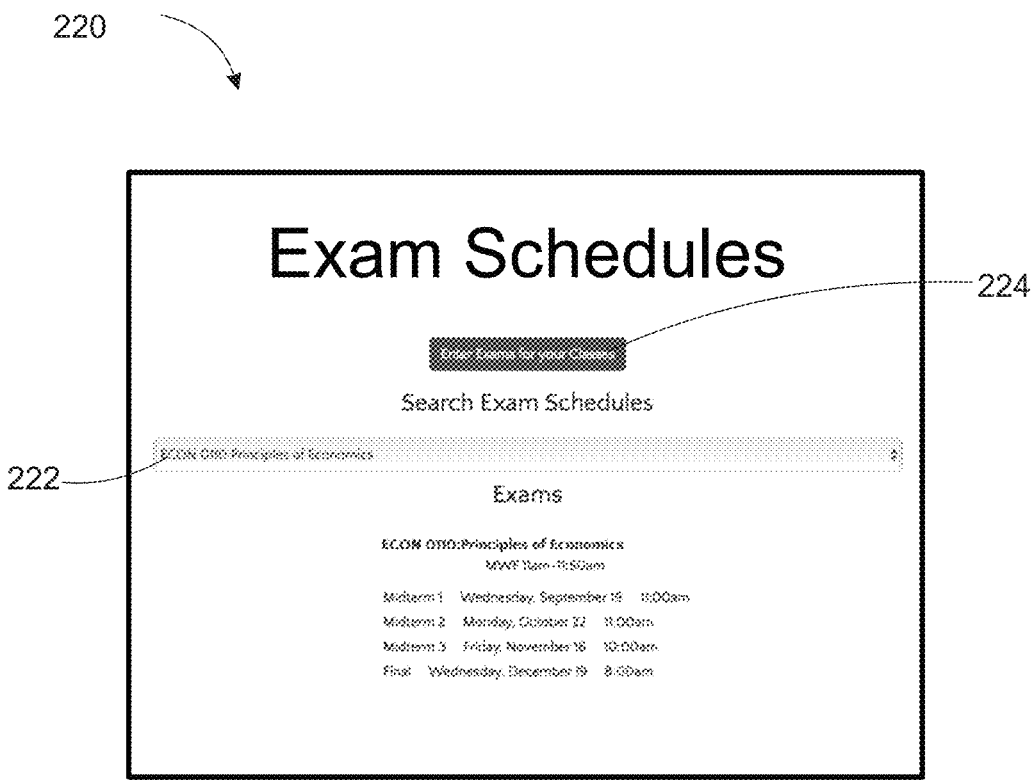
FIG. 19 is a view of an Exam Schedules interface in accordance with an embodiment.
Figure 20:
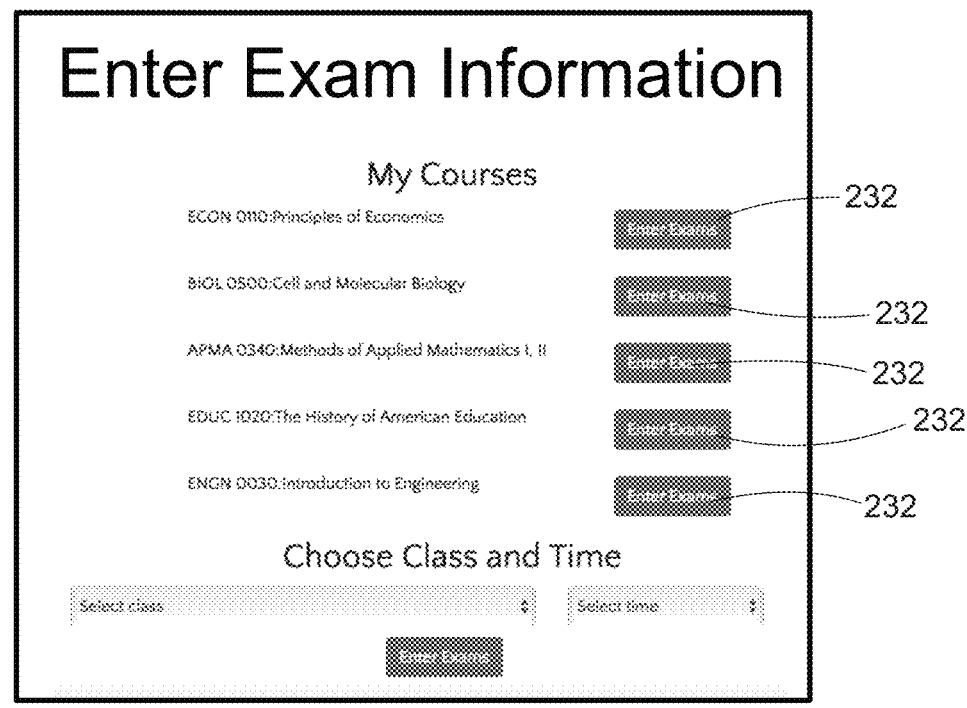
FIG. 20 is a view of an Enter Exam Information interface in accordance with an embodiment.

FIG. 18 depicts an Exam Schedules interface 220 according to an embodiment. This may be viewed whether the user is logged in or not. Exam Schedules interface 220 shows a listing of exams for all classes, with the exams sorted chronologically. Exam Schedules interface 220 may have a search bar 222 to select a class and see the exams for just that class, as shown in FIG. 19. Exam Schedules interface 220 may include a button 224, such as the button 224 that says, "Enter Exams for your Classes". By clicking on button 224, the user computing device 102 operates to depict Enter Exam Information interface 230 as depicted in FIG. 20, which displays the courses listed in the user's My Profile interface. In embodiments of the Exam Information interface 230, next to each course is a button 232 that may say, "Enter Exams". When clicking this button 232 the user computing device 102 displays Upload Exam Information interface 240 with fields to be filled out. In another embodiment, if the user wishes to enter exam information for a course not listed in the My Profile interface, the user can choose the class (via the dropdown of classes) and time (of the class) [via a dropdown]. When the user clicks the "Enter Exam" button 232 below these dropdowns, the user computing device 102 may display the Upload Exam Information interface 240 with fields to be filled out.

Figure 21:
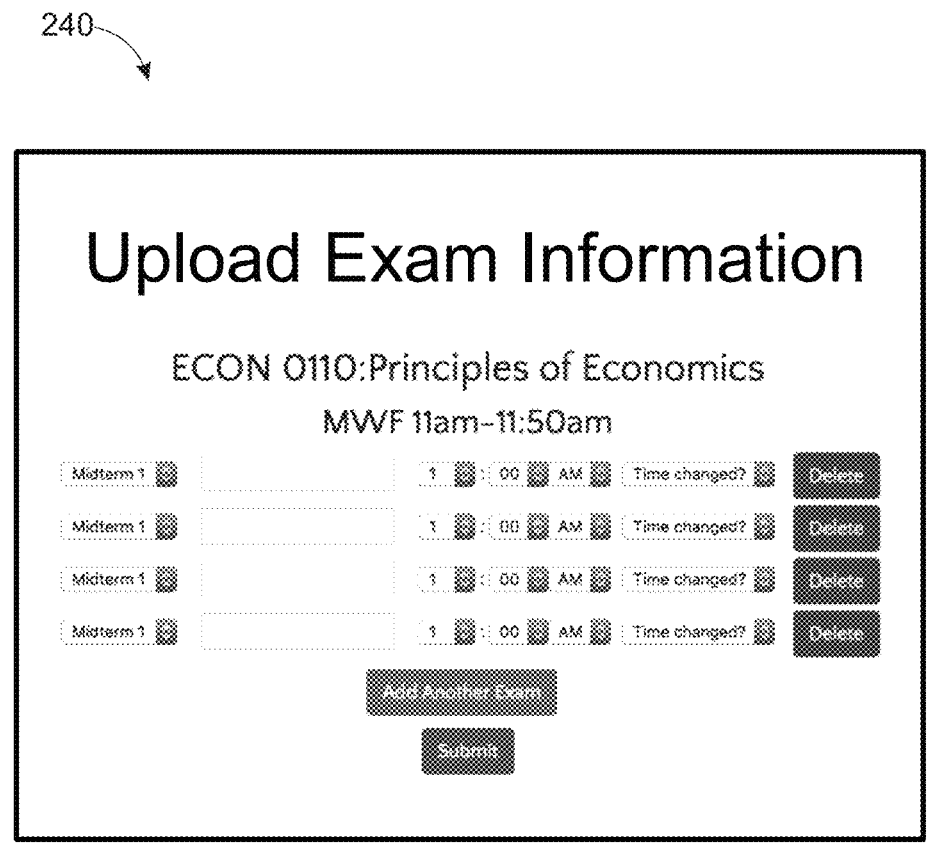
Figure 22:
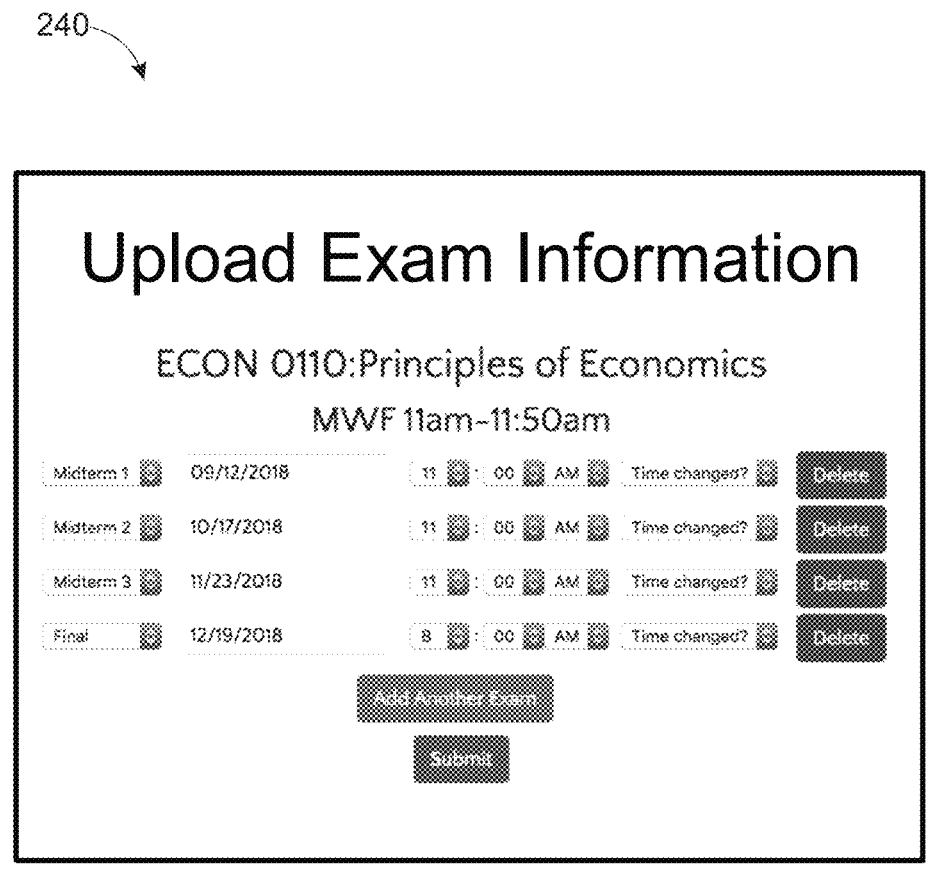
Figure 23:
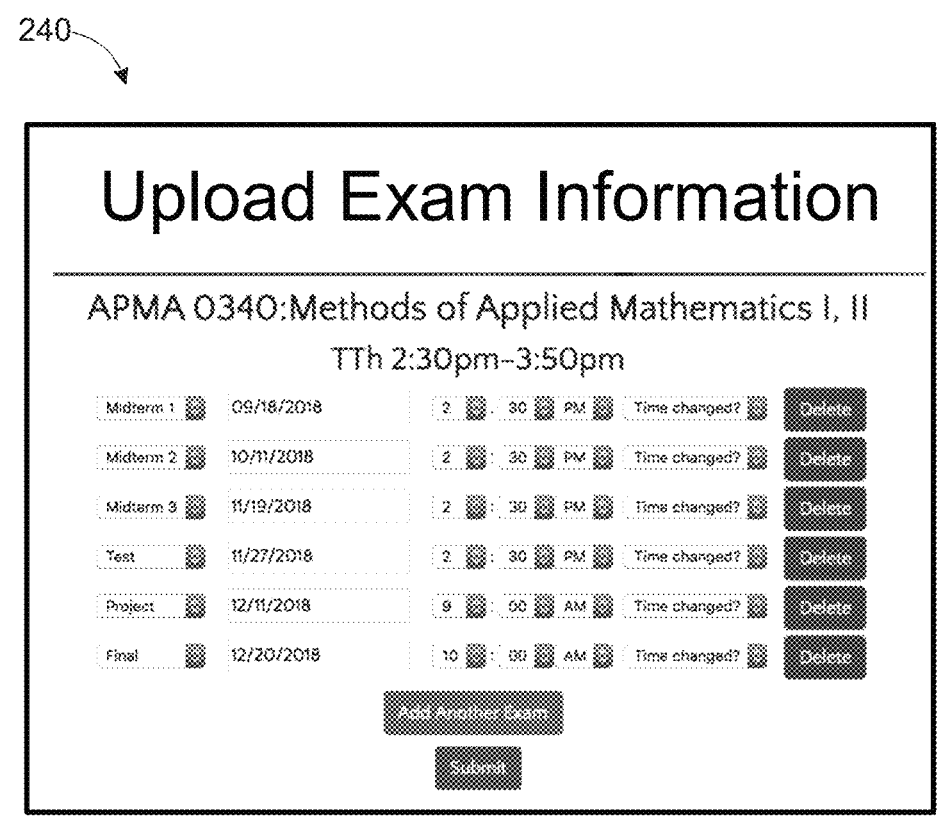

FIG. 21 depicts a view of an Upload Exam Information interface 240 with fields to be filled out for uploading exam information for a class. Once a user computing device 102 is displaying this interface 240, the user has already selected a class and time (or it has been auto-populated if the class is already in the user's My Profile interface). Upload Exam Information interface 240 may include a dropdown to choose the type of exam. The Exam Type options may include, but are not limited to Midterm 1, Midterm 2, Midterm 3, Project, Final, Test, and the like. The user may then choose the date of the exam. This may be entered by using a calendar icon to choose the date, or simply entering the date. The time for the exam may be entered by utilizing a dropdown menu for the hours, minutes, and AM/PM. Further, the Upload Exam Information interface 240 may include a dropdown to indicate if the details of that exam have been changed. A user can add more exams for that class by clicking "Add Another Exam." When a user hits submit, the information is recorded. Examples of a filled in Upload Exam Information interface 240 are provided in FIGS. 22 and 23 as examples.

Embodiments may be available on or through the internet, such as through domain names reserved and owned by Applicant that include mybrainchain.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A group study system comprising:
a server having a memory for storing study session information, including class, date, time and location of at least one study session and user information for each user; and
a first and second user computing device coupled to the server, the first and second user computing device each operating an application to access the system and couple to the server, wherein the server is programmed to:
receive from the first computing device a signal including a request to create a first study session, wherein the request includes first study session information including a class or subject topic, a date, a time and a location of the first study session;
automatically process the request and create a first study session interface searchable and viewable by other user computing devices accessing the system;
receive from the second user computing device a signal including a request to view details of the first study session and automatically process the request and access stored study session information stored in the memory;
automatically send details of the first study session for display on the second user computing device including a date, time and location of the first study session and a selectable option to join the first study session in response to analyzing the first study session information stored in the memory; and
receive from the second user computing device a signal including a request to join the study session and process the request and add user of the second user computing device to the first study session, wherein all students joining the group are anonymous, wherein the user information includes grade point average stored in the memory of the server, and wherein the server is further programmed to determine an average grade point average of all students who joined the first study session and send instruction to the user computing devices for display the average grade point average of students who have joined the first study session.

2. The group study system of claim 1, wherein the server is further programmed to automatically store examination information including date and time of at least one examination of a class received from the user computing device.

3. The group study system of claim 2, wherein the server is further programmed to automatically compare the user information with the examination information to determine that the class information of the user information matches the class of the at least one examination of the examination information, and automatically send an alert to the user computing device at predetermined times prior to the date and time of the at least one examination reminding the user of an upcoming at least one examination.

4. The group study system of claim 1, wherein the server is further programmed to determine a number of students who have joined the study session and send instruction to the user computing device for display the number of students who have joined the study session.

5. The group study system of claim 1, wherein the first user computing device is a device of a tutor and the first study session is a tutor guided study session, wherein the server is further programmed to display a selectable option to join and pay the tutor for joining the tutor guided study session.

6. The group study system of claim 1, wherein the server is further programmed to receive a signal from the first and the second user computing devices when the users attend the first study session and automatically check-in the first and the second user computing devices.

7. The group study system of claim 6, wherein the server is further programmed to receive study media from the first user computing device and the second user computing device and programmed to automatically provide same for access by the first user computing device and the second user computing device that have checked-in.

8. The group study session of claim 6, wherein the server is further programmed to send to the first and the second user computing device a reward in response to the server checking-in the first and the second user computing device.

9. A group study system comprising:
a server having a memory for storing study session information, including class, date, time and location of at least one study session and user information for each user; and
a first and second user computing device coupled to the server, the first and second user computing device each operating an application to access the system and couple to the server, wherein the server is programmed to:
receive from the first computing device a signal including a request to create a first study session, wherein the request includes first study session information including a class or subject topic, a date, a time and a location of the first study session;
automatically process the request and create a first study session interface searchable and viewable by other user computing devices accessing the system;
receive from the second user computing device a signal including a request to view details of the first study session and automatically process the request and access stored first study session information stored in the memory;
automatically send details of the first study session for display on the second user computing device including a date, time and location of the first study session and a selectable option to join the first study session in response to analyzing the study session information stored in the memory, wherein the location is a virtual location is an online audio/video conference; and
receive from the second user computing device a signal including a request to join the study session and process the request and add user of the second user computing device to the first study session, wherein all students joining the group are anonymous, wherein the server is further programmed to automatically store examination information including date and time of at least one examination of a class received from the user computing device, wherein the user information includes grade point average stored in the memory of the server, and wherein the server is further programmed to determine an average grade point average of all students who joined the study session and send instruction to the user computing devices for display the average grade point average of students who have joined the first study session.

10. The group study system of claim 9, wherein server is further programmed to automatically compare the user information with the examination information to determine that the class information of the user information matches the class of the at least one examination of the examination information, and automatically send an alert to the user computing device at predetermined times prior to the date and time of the at least one examination reminding the user of an upcoming at least one examination.

11. The group study system of claim 9, wherein the server is further programmed to determine a number of students who have joined the study session and send instruction to the user computing device for display the number of students who have joined the study session.

12. The group study system of claim 9, the first user computing device is a device of a tutor and the first study session is a tutor guided study session, wherein the server is further programmed to display a selectable option to join and pay the tutor for joining the tutor guided study session.

13. The group study system of claim 9, wherein the server is further programmed to receive a signal from the first and the second user computing devices when the users attend the first study session and automatically check-in the first and the second user computing devices.

14. The group study system of claim 13, wherein the server is further programmed to receive study media from the first user computing device and the second user computing device and automatically provide same for access by the first user computing device and the second user computing device that have checked-in.

15. The group study session of claim 14, wherein the server is further programmed to send to the first and the second user computing devices a reward in response to the server checking-in the first and the second user computing devices.

16. A group study system comprising:
a server having a memory for storing examination information; and
a plurality of user computing devices coupled to the server, each of the plurality of user computing devices operating an application to access the system and couple to the server, wherein the server is programmed to:
automatically store the examination information including date and time of at least one examination of a class received from at least one user computing device of the plurality of user computing devices;
automatically compare user information stored in the memory of the server with the examination information to determine that class information and the user information matches the class of the at least one examination of the examination information; and
automatically send an alert to all user computing devices of the plurality of user computing devices with a matching class at predetermined times prior to the date and time of the at least one examination a notification reminding the user of an upcoming at least one examination, and wherein the server is further programmed to determine an average grade point average of all students who took the at least one examination and send instruction to the plurality of user computing devices for display the average grade point average of students who have joined the study session.

* * * * *